United States Patent
Jonsson (10) Patent No.: US 10,228,444 B2
(45) Date of Patent: Mar. 12, 2019

(54) METHOD AND SYSTEM FOR DETERMINING WHETHER A PORTABLE KEY DEVICE IS LOCATED IN AN ACTIVE AREA IN RELATION TO A BARRIER

(71) Applicant: ASSA ABLOY AB, Stockholm (SE)

(72) Inventor: Tomas Jonsson, Ronninge (SE)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 15/561,228

(22) PCT Filed: Mar. 24, 2016

(86) PCT No.: PCT/EP2016/056597
§ 371 (c)(1),
(2) Date: Sep. 25, 2017

(87) PCT Pub. No.: WO2016/156228
PCT Pub. Date: Oct. 6, 2016

(65) Prior Publication Data
US 2018/0052217 A1    Feb. 22, 2018

(30) Foreign Application Priority Data
Mar. 27, 2015 (EP) ..................................... 15161367

(51) Int. Cl.
*G01S 5/04*    (2006.01)
*G01S 5/00*    (2006.01)
(Continued)

(52) U.S. Cl.
CPC .................. *G01S 5/04* (2013.01); *G01S 3/46* (2013.01); *G01S 3/50* (2013.01); *G01S 5/00* (2013.01);
(Continued)

(58) Field of Classification Search
CPC ... G01S 5/04; G01S 19/51; G01S 3/50; G01S 5/06; G01S 5/10; G01S 5/00;
(Continued)

(56) References Cited

U.S. PATENT DOCUMENTS 6,661,335 B1 * 12/2003 Seal ........................ G01S 5/10
340/10.1
7,425,886 B2 * 9/2008 Yoshii et al. ................ 340/5.72
(Continued)

FOREIGN PATENT DOCUMENTS

WO    WO 2012/174387    12/2012
WO    WO 2013/087787 A1    6/2013
(Continued)

OTHER PUBLICATIONS

International Search Report prepared by the European Patent Office dated Jul. 25, 2016, for International Application No. PCT/EP2016/056597.
(Continued)

*Primary Examiner* — Meless N Zewdu
(74) *Attorney, Agent, or Firm* — Sheridan Ross P.C.

(57) ABSTRACT

It is presented a method for determining whether a portable key device is located in an active area in relation to a barrier. The method is performed in an access control device and comprising the steps of: detecting a first angle of arrival of a wireless signal from the portable key device using a first pair of separated antennas; detecting a second angle of arrival of a wireless signal from the portable key device using a second pair of separated antennas; determining a first pair of directions based on the first angle of arrival; determining a second pair of directions based on the second angle of arrival; determining a position of the portable key device to be where one of the first pair of directions intersects one of the second pair of directions; and determining whether the
(Continued)

portable key device is located in the active area based on the position.

13 Claims, 4 Drawing Sheets

(51) Int. Cl.
| | |
|---|---|
| *H04W 4/80* | (2018.01) |
| *G01S 3/46* | (2006.01) |
| *G01S 5/14* | (2006.01) |
| *G01S 3/50* | (2006.01) |
| *G01S 19/51* | (2010.01) |
| *H04W 4/02* | (2018.01) |
| *H04W 40/06* | (2009.01) |
| *G01S 5/06* | (2006.01) |
| *G01S 3/48* | (2006.01) |
| *G01S 5/12* | (2006.01) |

(52) U.S. Cl.
CPC ............... *G01S 5/14* (2013.01); *G01S 19/51* (2013.01); *H04W 4/02* (2013.01); *H04W 4/80* (2018.02); *G01S 3/48* (2013.01); *G01S 5/06* (2013.01); *G01S 5/12* (2013.01); *G07C 2209/63* (2013.01); *H04W 40/06* (2013.01)

(58) Field of Classification Search
CPC ...... G01S 5/0242; G01S 5/0289; G01S 7/282; G01S 7/285; G01S 5/12; G01S 3/46; G01S 3/48; G01S 5/14; H04W 4/02; H04W 40/06; H04W 4/80; B60R 2300/406; G07C 2209/63
See application file for complete search history.

(56) References Cited

U.S. PATENT DOCUMENTS

| | | | |
|---|---|---|---|
| 7,446,644 B2 * | 11/2008 | Schaffzin et al. ............. | 340/5.6 |
| 8,009,023 B2 * | 8/2011 | Bergerhoff et al. ...... | 340/426.22 |
| 9,008,854 B2 * | 4/2015 | Breed .................... | G01C 21/26 701/1 |
| 2006/0279401 A1 * | 12/2006 | Yoshii ..................... | B60R 25/24 340/5.61 |
| 2008/0061964 A1 * | 3/2008 | Yoshida .................. | B60R 25/04 340/539.19 |
| 2011/0298600 A1 * | 12/2011 | Fujioka ............... | B60C 23/0408 340/426.36 |
| 2011/0309982 A1 | 12/2011 | Poisel | |
| 2012/0286926 A1 * | 11/2012 | Higemoto et al. ........... | 340/5.61 |
| 2013/0176107 A1 | 7/2013 | Dumas et al. | |
| 2013/0241694 A1 * | 9/2013 | Sharma et al. ........ | G08C 17/02 |
| 2017/0303094 A1 * | 10/2017 | Collar .................. | H04L 41/069 |

FOREIGN PATENT DOCUMENTS

| | | |
|---|---|---|
| WO | WO 2014/007754 A2 | 1/2014 |
| WO | WO 2015/010734 A1 | 1/2015 |
| WO | WO 2013/084030 A1 | 6/2016 |

OTHER PUBLICATIONS

Written Opinion prepared by the European Patent Office dated Jul. 25, 2016, for International Application No. PCT/EP2016/056597.
International Preliminary Report on Patentability (Chapter II) prepared by the European Patent Office dated Jan. 27, 2017, for International Application No. PCT/EP2016/056597.
Second Written Opinion prepared by the European Patent Office dated Mar. 7, 2017, for International Application No. PCT/EP2016/056597.
Applicant's Response Applicant's Response to the Second Written Opinion dated May 5, 2017, for International No. PCT/EP2016/056597.
Official Action for European Patent Application No. 15161367.6, dated Nov. 16, 2018, 5 pages.

* cited by examiner

METHOD AND SYSTEM FOR DETERMINING WHETHER A PORTABLE KEY DEVICE IS LOCATED IN AN ACTIVE AREA IN RELATION TO A BARRIER

CROSS REFERENCE TO RELATED APPLICATIONS

This application is a national stage application under 35 U.S.C. 371 and claims the benefit of PCT Application No. PCT/EP2016/056597 having an international filing date of 24 Mar. 2016, which designated the United States, which PCT application claimed the benefit of European Patent Application No. 15161367.6 filed 27 Mar. 2015, the disclosure of each of which are incorporated herein by reference.

TECHNICAL FIELD

The invention relates to a method, access control device, computer program and computer program product for determining whether a portable key device is located in an active area in relation to a barrier.

BACKGROUND

Lock devices and key devices are evolving from the traditional pure mechanical locks. These days, there are wireless interfaces for electronic lock devices, e.g. by interacting with a portable key device. For instance, Radio Frequency Identification (RFID) has been used as the wireless interface. When RFID is used, the user needs to present the portable key device very close to a reader of the lock. However, in order to provide a more user friendly solution, wireless interfaces with greater range are starting to be used. This allows the interaction between the portable key device and the lock to occur without user interaction, e.g. with a portable key device being located in a pocket or handbag. However, in such a situation, there is a risk that someone on the inside unlocks the lock device by simply walking by the lock device. In order to prevent this from happening, without introducing user interaction to open the lock device, there needs to be a way to determine whether a portable key device is on the inside or on the outside.

US 2013/0176107 presents a wireless access control system includes a remote access device and an electronic lock. The electronic lock communicates with the remote access device. The electronic lock controls the ability to lock and unlock a door in which the electronic lock is disposed. The electronic lock determines when the remote access device is at a distance less than or equal to a predetermined distance from the lock to enable the lock to be unlocked. More specifically, an internal antenna and an external antenna are used to determine which side the user is on. If a calibrated RSSI from the internal antenna is greater than the RSSI reading or readings from external antenna, user is determined to be on the inside.

However, such a determination of position based on dual antenna RSSI is not always ideal. In some circumstances, radio signals are distorted by reflections and fading which depends on external objects and interference, which can not be reliably controlled.

SUMMARY

It is an object to increase the accuracy in determining whether a portable key device is located in an active area in relation to a barrier.

According to a first aspect, it is presented a method for determining whether a portable key device is located in an active area in relation to a barrier, wherein the active area is on the outside of the barrier. The method is performed in an access control device and comprising the steps of: detecting a first angle of arrival of a wireless signal from the portable key device using a first pair of separated antennas; detecting a second angle of arrival of a wireless signal from the portable key device using a second pair of separated antennas; determining a first pair of directions based on the first angle of arrival; determining a second pair of directions based on the second angle of arrival; determining a position of the portable key device to be where one of the first pair of directions intersects one of the second pair of directions, wherein any intersection located between a first line between the first pair of antennas and a second line between the second pair of antennas is discarded for determining the position; and determining whether the portable key device is located in the active area based on the position. By basing this position determination on angle of arrival, rather than on RSSI based signal levels as in the prior art, a more stable determination is provided. Signal levels can fluctuate and be interfered with depending on a great number of factors while the timings of signal reception are much more dependent. Hence, the possibility of determining a correct position of a portable key device is significantly increased. Moreover, AoA is very difficult to manipulate, since it is the same signal that is received by the two antennas in the antenna pair. By defining the active area as being on the outside of the barrier, automatic access control can be disabled for inside key devices, preventing inadvertent unlocking from key devices on the inside.

In one embodiment, the active area is all of the outside of the barrier. Alternatively, the active area is defined by a border of any suitable configuration.

The step of detecting a first angle of arrival may comprise detecting the first angle of arrival based on a time difference of receiving the wireless signal in the first pair of separated antennas. In such a case, the step of detecting a second angle of arrival comprises detecting the second angle of arrival based on a time difference of receiving the wireless signal in the second pair of separated antennas.

The first pair of separated antennas and the second pair of separated antennas may contain one and only one common antenna. In other words, the first pair and the second pair share exactly one antenna.

The first pair of separated antennas and the second pair of separated antennas may contain different antennas. In other words, the first pair and the second pair have no antennas in common.

The step of determining a first pair of directions comprises determining each direction as a direction from a first midpoint between the first pair of antennas with the first angle of arrival being on either side, respectively, of a first line between the first pair of antennas, and the step of determining a second pair of directions comprises determining each direction as a direction from a second midpoint between the second pair of antennas with the second angle of arrival being on either side, respectively, of a second line between the second pair of antennas.

The step of determining may comprise discarding any intersection located between a first line between the first pair of antennas and a second line between the second pair of antennas.

The method may further comprise the step of: determining a distance to the portable key device from one of the antennas. In such a case, the step of determining a position comprises determining a position based on the distance.

The step of determining a position may comprise determining a position in three dimensions.

According to a second aspect, it is presented an access control device arranged to determine whether a portable key device is located in an active area in relation to a barrier, wherein the active area is on the outside of the barrier. The access control device comprises: a processor; and a memory storing instructions that, when executed by the processor, causes the access control device to: detect a first angle of arrival of a wireless signal from the portable key device using a first pair of separated antennas; detect a second angle of arrival of a wireless signal from the portable key device using a second pair of separated antennas; determine a first pair of directions based on the first angle of arrival; determine a second pair of directions based on the second angle of arrival; determine a position of the portable key device to be where one of the first pair of directions intersects one of the second pair of directions, wherein any intersection located between a first line between the first pair of antennas and a second line between the second pair of antennas is discarded for determining the position; and determining whether the portable key device is located in the active area based on the position.

The instructions to detect a first angle of arrival may comprise instructions that, when executed by the processor, causes the access control device to detect the first angle of arrival based on a time difference of receiving the wireless signal in the first pair of separated antennas. In such a case, the instructions to detect a second angle of arrival comprise instructions that, when executed by the processor, causes the access control device to detecting the second angle of arrival based on a time difference of receiving the wireless signal in the second pair of separated antennas.

The first pair of separated antennas and the second pair of separated antennas may contain one and only one common antenna.

The first pair of separated antennas and the second pair of separated antennas may contain different antennas.

The instructions to determine a first pair of directions may comprise instructions that, when executed by the processor, causes the access control device to determine each direction as a direction from a first midpoint between the first pair of antennas with the first angle of arrival being on either side, respectively, of a first line between the first pair of antennas. In such a case the instructions to determine a second pair of directions comprise instructions that, when executed by the processor, causes the access control device to determine each direction as a direction from a second midpoint between the second pair of antennas with the second angle of arrival being on either side, respectively, of a second line between the second pair of antennas.

The instructions to determine may comprise instructions that, when executed by the processor, causes the access control device to discard any intersection located between a first line between the first pair of antennas and a second line between the second pair of antennas.

The first pair of antennas and the second pair of antennas may be provided in one plane.

The access control device may further comprise instructions that, when executed by the processor, causes the access control device to determine a distance to the portable key device from one of the antennas. In such a case, the instructions to determine a position comprise instructions that, when executed by the processor, causes the access control device to determine a position based on the distance.

The instructions to determine a position may comprise instructions that, when executed by the processor, causes the access control device to determine a position in three dimensions.

According to a third aspect, it is presented a computer program for determining whether a portable key device is located in an active area in relation to a barrier, wherein the active area is on the outside of the barrier.

The computer program comprises computer program code which, when run on an access control device, causes the access control device to: detect a first angle of arrival of a wireless signal from the portable key device using a first pair of separated antennas; detect a second angle of arrival of a wireless signal from the portable key device using a second pair of separated antennas; determine a first pair of directions based on the first angle of arrival; determine a second pair of directions based on the second angle of arrival; determine a position of the portable key device to be where one of the first pair of directions intersects one of the second pair of directions, wherein any intersection located between a first line between the first pair of antennas and a second line between the second pair of antennas is discarded for determining the position; and determining whether the portable key device is located in the active area based on the position.

According to a fourth aspect, it is presented a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
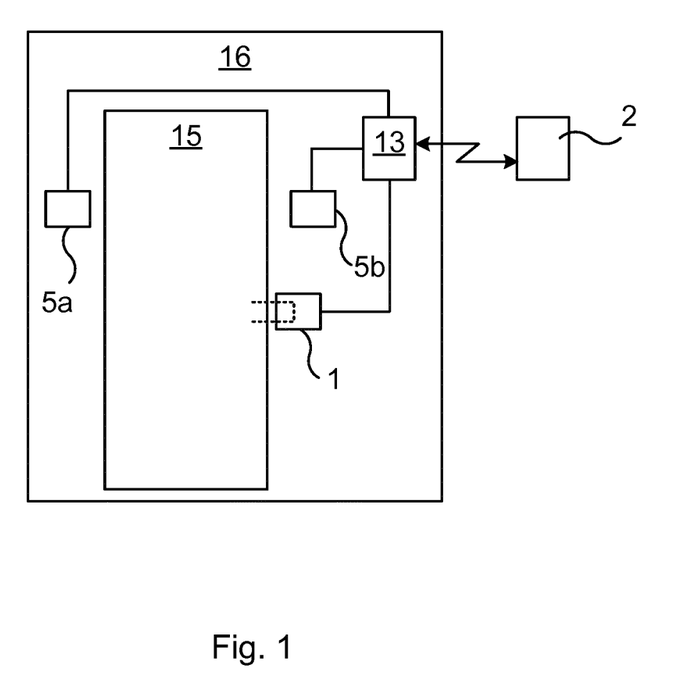
FIG. 1 is a schematic diagram showing an environment in which embodiments presented herein can be applied.

FIG. 1 is a schematic diagram showing an environment in which embodiments presented herein can be applied.

Access to a physical space 16 is restricted by a physical barrier 15 which is selectively unlockable. For instance, the barrier 15 can be a door, gate, hatch, window, etc. In order to unlock the barrier 15, an access control device 13 is provided. The access control device 13 is connected to a physical lock device 1, which is controllable by the access control device 13 to be set in an unlocked state or locked state. In this embodiment, the access control device 13 is mounted close to the physical lock device 1.

The access control device 13 communicates with a portable key device 2 over a wireless interface using a plurality of antennas 5a-b. The portable key device 2 is any suitable device portable by a user and which can be used for authentication over the wireless interface. The portable key device 2 is typically carried or worn by the user and may be implemented as a mobile phone, a smartphone, a key fob, wearable device, smart phone case, RFID (Radio Frequency Identification) card, etc. In FIG. 1, only two antennas 5a-b can be seen. However, there is at least one more antenna provided in connection with the access control device 13, to allow two separate pairs of antennas to be provided. Using wireless communication, the authenticity and authority of the portable key device can be checked in an unlock procedure, e.g. using a challenge and response scheme, after which the access control device grants or denies access. Alternatively or additionally, the portable key device can be used in the same way to, when granted, trigger the barrier to be opened e.g. using a door opener. As described in more detail below, the antennas are also used, in pairs, to detect angles of arrival to the portable key device 2, to thereby determine whether the portable key device 2 is within an active area in relation to the barrier 15. The active area is defined such that it is beneficiary to trigger access control when the portable key device is located in the active area.

Providing multiple antennas provides additional benefits. For instance, the antennas can be used for beam forming, multiple input/multiple output (MIMO) transmissions, redundancy between antennas, differential antennas, etc.

When access is granted, the access control device 13 sends an unlock signal to the lock device 1, whereby the lock device 1 is set in an unlocked state. In this embodiment, this can e.g. imply a signal over a wire-based communication, e.g. using a serial interface (e.g. RS485, RS232), Universal Serial Bus (USB), Ethernet, or even a simple electric connection (e.g. to the lock device 1), or alternatively a wireless interface. When the lock device 1 is in an unlocked state, the barrier 15 can be opened and when the lock device 1 is in a locked state, the barrier 15 cannot be opened. In this way, access to a closed space 16 is controlled by the access control device 13. It is to be noted that the access control device 13 and/or the lock device 1 can be mounted in a fixed structure (e.g. wall, frame, etc.) by the physical barrier 15 (as shown) or in the physical barrier 15 (not shown).

Figure 2A:
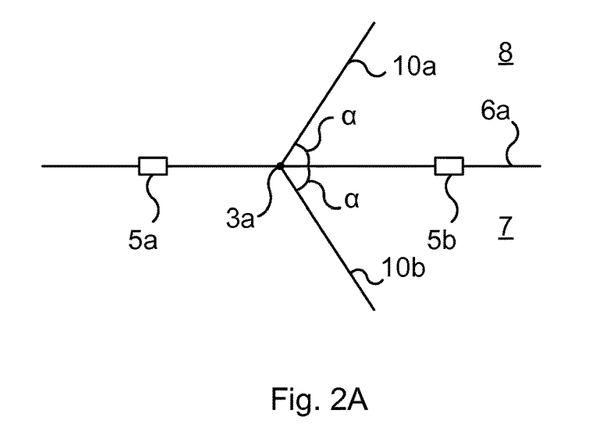
FIGS. 2A-D are schematic top view diagrams illustrating how angles of arrival are used to determine a position of a portable key device in the environment shown in FIG. 1.
Figure 2B:
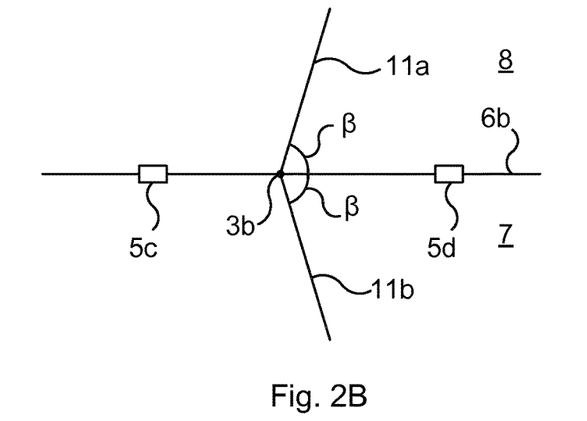
Figure 2C:
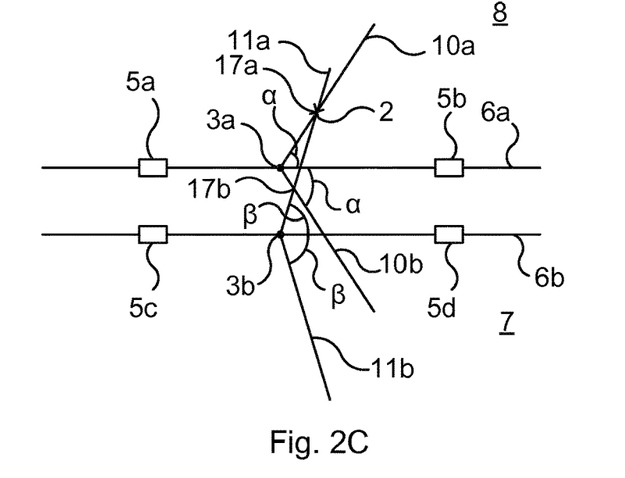

FIGS. 2A-D are schematic top view diagrams illustrating how angles of arrival are used to determine a position of a portable key device in the environment shown in FIG. 1. By determining the position of the portable key device, it can be determined whether the portable key device is within an active area or not. In the embodiment of FIGS. 2A-C, the active area is defined simply as the outside 8 (of the barrier). When the portable key device is located in the active area, further actions related to unlocking and/or opening of the barrier can be performed. In this way, inadvertent unlocking and/or opening of the barrier is prevented. Inside is to be construed as the side of the barrier which is protected from access using the barrier. Outside is the opposite side from the inside. It is to be noted that the outside of the barrier can be on the inside in relation to another barrier.

In FIG. 2A, a first pair of antennas, consisting of a first antenna 5a and a second antenna 5b, are shown, with a first line 6a between them. The first line 6a is a straight line and does not need to exist physically. A first midpoint 3a is shown on the first line 6a in a centre position between the first antenna 5a and the second antenna 5b. The first antenna 5a and second antenna 5b are separated. With UWB (Ultra Wide Band) transmissions, the distance between a pair of antennas can be as small as three cm.

In this way, when a wireless signal is received from the portable key device 2, a time difference in receiving the wireless signal can be detected. This can e.g. be detected using a phase difference between the received signals. Using the time difference, a first angle of arrival (AoA) $\alpha$ is calculated. However, the first AoA $\alpha$ is only in relation to the first line 6a between the first pair of antennas 5a, 5b. In other words, from the first midpoint 3a, the portable key device can be along a first direction 10a, being on the outside 8 of the first line 6a or along a second direction 10b, being on the inside 7 of the first line 6a. The first and second directions 10a, 10b are collectively denoted a first pair of directions.

In FIG. 2B, a similar situation to that of FIG. 2A occurs, but with a second pair of antennas, consisting of a third antenna 5c and a fourth antenna 5d. There is a second line 6b between second pair of antennas. The second line 6b is a straight line and does not need to exist physically. A second midpoint 3b is shown on the second line 6b in a centre position between the third antenna 5c and the fourth antenna 5d. Also the third antenna 5c and fourth antenna 5d are separated. In this way, when a wireless signal is received from the portable key device 2, a time difference in receiving the wireless signal can be detected. This can e.g. be detected using a phase difference between the received signals. Using the time difference, a second angle of arrival (AoA) $\beta$ is calculated. However, the second AoA angle $\beta$ is only in relation to the second line 6b between the second pair of antennas 5c, 5d. In other words, from the second midpoint 3b, the portable key device can be along a third direction 11a, being on the outside 8 of the second line 6b or along a fourth direction 11b, being on the inside 7 of the second line 6b. The third and fourth directions 11a, 11b are collectively denoted a second pair of directions.

Looking now to FIG. 2C, this is a combination of FIG. 2A and FIG. 2B. The antennas are separated such that the first line 6a and the second line do not coincide. It is here considered that the inside 7 of the barrier is the area which is considered the inside both in relation to the first line 6a and the second line 6b. Analogously, it is here considered that the outside 8 of the barrier is the area which is considered the outside both in relation to the first line 6a and the second line 6b. The middle area is the area between the first line 6a and the second line 6b.

Here, the first pair of antennas 5a, 5b are located on the outside 8 of the barrier and the second pair of antennas 5c, 5d are located on the inside of the barrier 7. An advantage of this structure is that the RF (Radio Frequency) range is good both on the inside 7 of the barrier and the outside 8 of the barrier. Moreover, with two antennas on either side of the barrier, the antenna with the best performance can be used during the communication phase, e.g. when a door is opening or closing.

The first AoA α is determined using the first antenna 5*a* and the second antenna 5*b*, both located on the outside of the barrier. The second AoA β is determined using the third antenna 5*c* and the fourth antenna 5*d* located on the inside of the barrier. In some circumstances, the barrier itself results in a delay on a radio signal, which can distort the AoA when the antennas for calculating the AoA are located on either side of the barrier. However, in this embodiment, by not calculating the AoA using antennas on either side of the barrier, any delay on radio signals through the barrier do not distort the AoA result.

Using both the first AoA α and second AoA β, the portable key device 2 can now be determined to be located in a position where one of the first pair of directions 10*a*, 10*b* intersects one of the second pair of directions 11*a*, 11*b*.

In this example, this occurs in a first location 17*a*, and in a second location 17*b*. The first location 17*a* is on the outside 8 and the second location 17*b* is in the middle area, between the two lines 16*a*, 16*b*. In one embodiment, the second location 17*b* between the first line 6*a* between and the second line 6*b* is discarded and only positions being unambiguously on the inside 7 or the outside 8 are considered for the positioning. By discarding the intersection between the first line 6*a* and the second line 6*b*, only one intersection is left, whereby the position can be analytically determined. Moreover, it is thus unambiguously determined in this way whether the key device is on the outside or not. Significantly, the distance from the barrier is not of utmost importance since it is sufficient to determine whether the key device is on the outside of the barrier or not.

By basing this position determination on AoA, rather than on RSSI based signal levels as in the prior art, a more stable determination is provided. Signal levels can fluctuate and be interfered with depending on a great number of factors while the timings of signal reception are much more dependent. Hence, the possibility of determining a correct position of a portable key device is significantly increased. Moreover, AoA is very difficult to manipulate by an attacker, since the same signal is received by the two antennas in the antenna pair. Once the position is known, this can be compared with a predefined active area to determine whether to proceed with an unlock and/or open procedure for the barrier. For instance, the active area can be all of the outside 8, whereby if the portable key device is on the outside 8, the unlock/open procedure can proceed.

It is to be noted that the two pairs of antennas do not need to be on separate sides of the barrier, but could be on the same side but separate from each other.

Figure 2D:
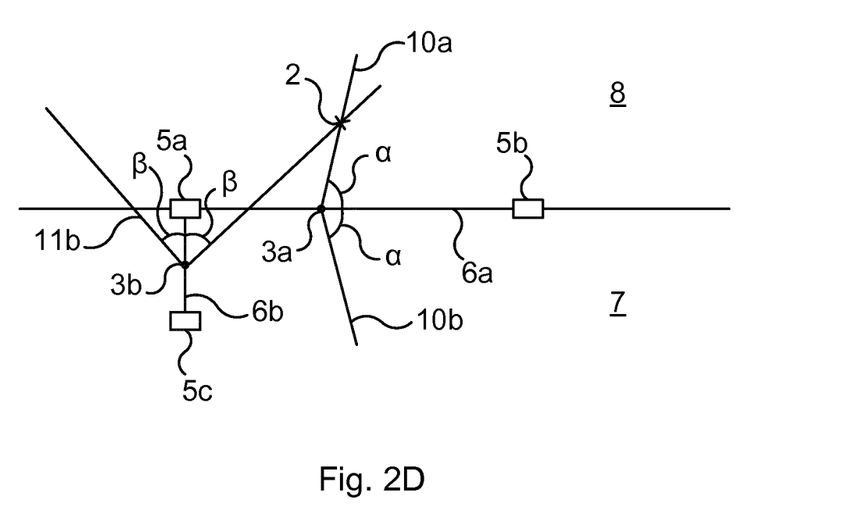

In FIG. 2D, an embodiment is shown where three antennas 5*a*, 5*b* and 5*c* are used. A first pair of antennas consists of the first antenna 5*a* and the second antenna 5*b*. A second pair of antennas consists of the first antenna 5*a* and a third antenna 5*c*. In other words, there is one and only one common antenna, the first antenna 5*a*, between the first and second pairs.

Analogously, there is a first AoA α and a second AoA β, allowing the first pair of directions 10*a-b*, and the second pair of directions 11*a-b* to be determined. The location of the portable key device 2 is then determined to be the location where one of the first pair of directions 11*a-b* intersects one of the second pair of directions 11*a-b*.

It is thus shown how it is determined whether a portable key device is located within an active area using two AoAs by means of only three antennas.

Optionally, the antennas are not positioned in the same plane. In one embodiment, this plane can be a normal plane of the barrier.

For the embodiments described with reference to FIGS. 2A-D, the antennas may be located in one plane. However, it is also possible that the antennas are not positioned in the same plane. This allows for greater accuracy in determining the position of the key device.

In one embodiment the four antennas 5*a-d* are positioned in corners of an imaginary tetrahedron, to provide maximum spread of the antennas for a given volume. It is to be noted though, that the antennas could be placed in any suitable positions and do not need to be equally spaced apart.

It is to be noted that the antennas 5*a-d* can be provided such that the first line 6*a* (between the first pair of antennas 5*a-b*) and the second line 6*b* (between the second pair of antennas 5*c-d*) are both provided essentially perpendicularly to the barrier. This can in some cases provide better accuracy for determining a position since the difference between first the AoA α and the second AoA β is greater at a typical usage position for the portable key device.

Optionally, more antennas are provided to allow calculations of more angles of arrival, thereby enhancing accuracy or allowing positioning in three dimensions.

Figure 3:
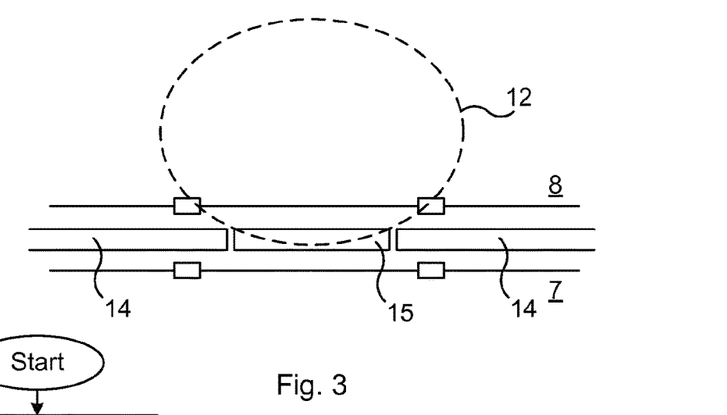
FIG. 3 is a schematic top view illustrating an alternative active area for use in the environment of FIG. 1.

FIG. 3 is a schematic top view illustrating an alternative active area for use in the environment of FIG. 1. Here, the active area 12 is defined more narrowly than simply the outside of a door. In fact, the active area 12 can be defined in any suitable way. Once the position is determined as explained above, it can be determined whether the portable key device is in the active area or not, after which further processing such as unlocking and/or opening of the barrier 15 can be triggered.

It is to be noted that the active area 12 can equally well be defined on the inside, e.g. for unlocking windows. Furthermore, the active area 12 can be determined in three dimensions, e.g. for preventing portable key devices on other floors from being considered to be in an active area. For instance, the active area can be limited to correspond in height to a floor of a building where the barrier is located.

Figure 4:
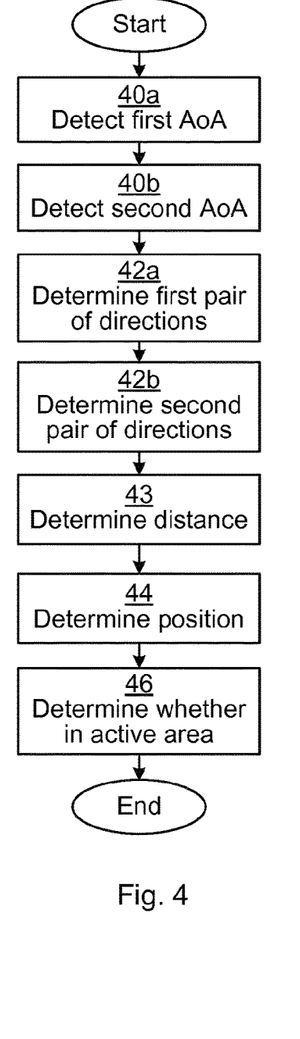
FIG. 4 is a flow chart illustrating an embodiment of a method performed in the access control device of FIG. 1 for determining whether a portable key device is within an active area in relation to a barrier.

FIG. 4 is a flow chart illustrating an embodiment of a method performed in the access control device of FIG. 1 for determining whether a portable key device is located within an active area in relation to inside or outside a barrier.

The method can e.g. be started when proximity of a portable key device is detected. Optionally, the method is performed repeatedly indefinitely as long as the access control device is operative.

In a detect first AoA step 40*a*, a first angle of arrival of a wireless signal from the portable key device is detected using a first pair of separated antennas, e.g. as shown in FIG. 2A and described above.

In a detect second AoA step 40*b*, a second angle of arrival of a wireless signal from the portable key device is detected using a second pair of separated antennas, e.g. as shown in FIG. 2B and described above.

The first pair of separated antennas and the second pair of separated antennas are not identical sets. In other words, at least one antenna is not the same between the two pairs. In other words, the first pair of separated antennas and the second pair of separated antennas may contain one and only one common antenna, such as shown in the embodiment of FIG. 2D and described above. Alternatively, the first pair of separated antennas and the second pair of separated antennas contain different antennas, i.e. no common antenna, such as shown in the embodiment of FIG. 2C and described above.

The detecting of angles of arrival can be based on a time difference of receiving the wireless signal. For the first angle of arrival, this is based on the first pair of separated antennas and for the second angle of arrival this is based on the second pair of separated antennas.

In a determine first pair of directions step 42*a*, a first pair of directions are determined based on the first angle of arrival, e.g. as shown in FIG. 2A and described above for the first direction 10*a* and the second direction 10*b*.

In a determine second pair of directions step 42*b*, a second pair of directions are determined based on the second angle of arrival, e.g. as shown in FIG. 2B and described above for the third direction 11*a* and the fourth direction 11*b*.

The determining of directions can comprise determining each direction as a direction from a midpoint between the respective pair of antennas with the associated angle of arrival being on either side, respectively, of a line between the pair of antennas, as shown in FIGS. 2A-B and described above.

In an optional determine distance step 43, a distance to the portable key device is determined using one of the antennas. Which antenna is used is not important. This can be e.g. be done using two way ranging, where a first signal is sent to the portable key device from the antenna, after which the portable key device responds with a second signal. Using the time difference from when the first signal was sent and when the second signal was received, the distance to the portable key device can be determined.

In a determine position step 44, the portable key device is determined to be located in a position where one of the first pair of directions intersects one of the second pair of directions. It is to be noted that the accuracy for this determination does not need to be extreme; it is sufficient that the location of the portable key device is merely determined to be on the inside or the outside.

Optionally, this step comprises determining a position based on the distance determined in the determine distance step 43. For instance, by using the distance, a position in three dimensions can be determined for the portable key device. It is also to be noted that the position of the portable key device can be determined in three dimensions using more angle of arrival measurements.

In a determine whether in active area step 46, it is determine whether the portable key device is located within a predefined active area based on the determined position. In one embodiment, the active area is defined as anywhere on the outside of the barrier. In one embodiment, the active area is defined by an external border, such that the portable key device is in the active area when it is inside the external border (e.g. as shown in FIG. 3 and described above).

If the pairs of directions intersect in two locations, and one intersection is located between a line between the first pair of antennas and a line between the second pair of antennas, i.e. in the middle area, such an intersection point is discarded. This situation is shown in FIG. 2C and described above.

The knowledge of whether the portable key device is within the active area or not is used to then decide whether to proceed with access control or not. If the portable key device is determined to be within the active area, then the access determination procedure can proceed, resulting in granted or denied access. On the other hand, if the portable key device is determined to be outside the active area, no further access determination is performed. When access control is performed without user interaction, this prevents someone on outside the active area from unlocking the lock device by simply walking by the access control device.

Alternatively or additionally, the same logic can be used to determine whether to open the barrier, e.g. using an automatic door opener. In other words, the usability of longer range wireless radio is achieved, but with the location security of the prior art RFID based solutions. Moreover, by separating the antennas from the access control device, the hardware can be placed in any suitable position in the vicinity. For instance, the access control device can be placed in a position in the barrier or surrounding structure which is not accessible unless the barrier is open, to provide further protection against attacks. Alternatively, the access control device can be placed on the inside or door opener and still control access for portable key devices on the outside.

Figure 5:
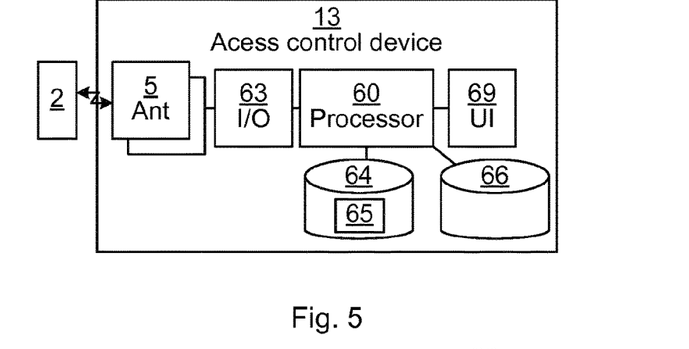
FIG. 5 is a schematic diagram illustrating an embodiment of the access control device of FIG. 1.

FIG. 5 is a schematic diagram illustrating an embodiment of the access control device 13 of FIG. 1.

A processor 60 controls the general operation of access control device 13. The processor 60 can be any combination of one or more of a suitable central processing unit (CPU), multiprocessor, microcontroller unit (MCU), digital signal processor (DSP), application specific integrated circuit (ASIC) etc., capable of executing software instructions or otherwise configured to behave according to predetermined logic. Hence, the processor 60 can be capable of executing software instructions 65 stored in a memory 64, which can thus be a computer program product. The processor 60 can be configured to execute the method described with reference to FIG. 4 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60, for instance angles of arrivals and directions. The data memory 66 can be any combination of read and write memory (RAM) and read only memory (ROM).

The access control device 13 further comprises an I/O interface 63 for communicating with other external entities such as the lock device 1 and a portable key device 2, e.g. to exchange digital authentication data. The I/O interface 63 communicates with the portable key device 2 over a wireless interface using a plurality of antennas 5. The antennas 5, as explained above, can be used to determine the position of the portable key device. The I/O interface 63 supports wireless communication over any suitable wireless interface, e.g. using Bluetooth, Bluetooth Low Energy (BLE), any of the IEEE 802.15 standards, Radio Frequency Identification (RFID), Near Field Communication (NFC), any of the IEEE 802.11 standards, wireless USB, etc.

The I/O interface 63 may also support wire-based communication, e.g. using Universal Serial Bus (USB), Ethernet, or even a simple electric connection, e.g. to the lock device 1.

Optionally, the access control device 13 also includes a user interface 9, e.g. comprising any one or more of a light emitting diodes (LED) or other lights, a display, keys or keypad, etc.

Optionally, the access control device 13 is combined with the lock device 1 in a single device. In such a case, one or more of the components of the access control device 13 can be shared with the lock device 1. In another embodiment, the access control device 13 is housed within a housing of a door opener. This provides for a simple installation. In such an embodiment, some or all of the antennas may also be places within the housing of the door opener.

Figure 6:
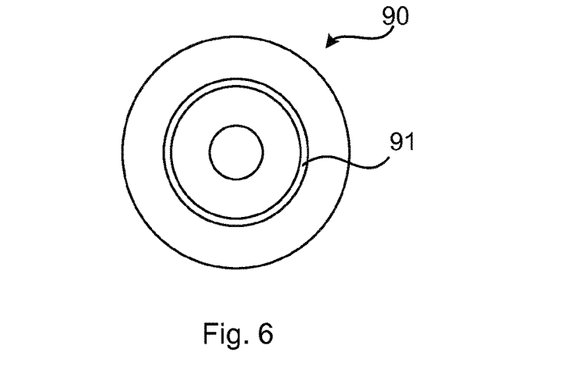
FIG. 6 shows one example of a computer program product comprising computer readable means.

FIG. 6 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

It is to be noted that while embodiments presented herein are used for determining the position of a portable key device in two dimension, the same principle can be expanded for positioning in three dimensions, in which case a third antenna pair (which can include an antenna in another pair) is used.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for determining whether a portable key device is located in an active area in relation to a barrier, wherein the active area is on the outside of the barrier, the method being performed in an access control device and comprising the steps of:
   detecting a first angle of arrival of a wireless signal from the portable key device using a first pair of separated antennas;
   detecting a second angle of arrival of the wireless signal from the portable key device using a second pair of separated antennas, wherein the first pair of antennas is located on the outside of the barrier and the second pair of antennas is located on the inside of the barrier;
   determining a first pair of directions based on the first angle of arrival;
   determining a second pair of directions based on the second angle of arrival;
   determining a position of the portable key device to be where one of the first pair of directions intersects one of the second pair of directions, wherein any intersection located between a first line between the first pair of antennas and a second line between the second pair of antennas is discarded for determining the position; and
   determining whether the portable key device is located in the active area based on the position.

2. The method according to claim 1, wherein the step of detecting the first angle of arrival comprises detecting the first angle of arrival based on a time difference of receiving the wireless signal in the first pair of separated antennas and wherein the step of detecting the second angle of arrival comprises detecting the second angle of arrival based on a time difference of receiving the wireless signal in the second pair of separated antennas.

3. The method according to claim 1, wherein the first pair of separated antennas and the second pair of separated antennas contain one and only one common antenna.

4. The method according to claim 1, wherein the first pair of separated antennas and the second pair of separated antennas contain different antennas.

5. The method according to claim 1, wherein the step of determining the first pair of directions comprises determining each direction of the pair of directions as a direction from a first midpoint between the first pair of antennas with the first angle of arrival being on either side, respectively, of the first line between the first pair of antennas, and the step of determining the second pair of directions comprises determining each direction as a direction of the second pair of directions from a second midpoint between the second pair of antennas with the second angle of arrival being on either side, respectively, of the second line between the second pair of antennas.

6. The method according to claim 1, further comprising the step of:
   determining a distance to the portable key device from one of the antennas; and
   wherein the step of determining the position comprises determining the position based on the distance.

7. The method according to claim 6, wherein the step of determining the position comprises determining the position in three dimensions.

8. An access control device arranged to determine whether a portable key device is located in an active area in relation to a barrier, wherein the active area is on the outside of the barrier, the access control device comprising:
   a processor; and
   a memory storing instructions that, when executed by the processor, cause the access control device to:
   detect a first angle of arrival of the wireless signal from the portable key device using a first pair of separated antennas;
   detect a second angle of arrival of the wireless signal from the portable key device using a second pair of separated antennas, wherein the first pair of antennas is located on the outside of the barrier and the second pair of antennas is located on inside of the barrier;
   determine a first pair of directions based on the first angle of arrival;
   determine a second pair of directions based on the second angle of arrival;
   determine a position of the portable key device to be where one of the first pair of directions intersects one of the second pair of directions, wherein any intersection located between a first line between the first pair of antennas and a second line between the second pair of antennas is discarded for determining the position; and
   determining whether the portable key device is located in the active area based on the position.

9. The access control device according to claim 8, wherein the instructions to detect the first angle of arrival comprise instructions that, when executed by the processor, cause the access control device to detect the first angle of arrival based on a time difference of receiving the wireless signal in the first pair of separated antennas and wherein the instruction to detect the second angle of arrival comprise instructions that, when executed by the processor, cause the access control device to detecting the second angle of arrival based on a time difference of receiving the wireless signal in the second pair of separated antennas.

10. The access control device according to claim 8, wherein the instructions to determine the first pair of directions comprise instructions that, when executed by the processor, cause the access control device to determine each direction of the first pair of directions as a direction from a first midpoint between the first pair of antennas with the first angle of arrival being on either side, respectively, of the first line between the first pair of antennas, and the instructions to determine a second pair of directions comprise instructions that, when executed by the processor, cause the access control device to determine each direction of the second pair of directions as a direction from a second midpoint between the second pair of antennas with the second angle of arrival being on either side, respectively, of a second line between the second pair of antennas.

11. The access control device according to claim 8, further comprising instructions that, when executed by the processor, cause the access control device to determine a distance to the portable key device from one of the antennas; and wherein the instructions to determine the position comprise instructions that, when executed by the processor, cause the access control device to determine the position based on the distance.

12. A non-transitory computer program for determining whether a portable key device is located in an active area in relation to a barrier, wherein the active area is on outside of the barrier, the computer program comprising computer program code which, when run on an access control device, causes the access control device to:

detect a first angle of arrival of the wireless signal from the portable key device using a first pair of separated antennas;

detect a second angle of arrival of the wireless signal from the portable key device using a second pair of separated antennas, wherein the first pair of antennas is located on the outside of the barrier and the second pair of antennas is located on inside of the barrier;

determine a first pair of directions based on the first angle of arrival;

determine a second pair of directions based on the second angle of arrival; and     determine a position of the portable key device to be where one of the first pair of directions intersects one of the second pair of directions, wherein any intersection located between a first line between the first pair of antennas and a second line between the second pair of antennas is discarded for determining the position; and     determine whether the portable key device is located in the active area based on the position.

13. A non-transitory computer program product comprising a computer program according to claim 12 and a computer readable means on which the computer program is stored.

\* \* \* \* \*